(12) United States Patent
Henderson et al.

(10) Patent No.: US 11,921,898 B2
(45) Date of Patent: Mar. 5, 2024

(54) IDENTITY RESOLUTION AND DATA ENRICHMENT FRAMEWORK

(71) Applicant: Snowflake Inc., Bozeman, MT (US)

(72) Inventors: Marcus A. Henderson, San Marcos, CA (US); Justin Langseth, Kailua, HI (US); Jamie B. Pfeiffer, Jr., Northbrook, IL (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/661,337

(22) Filed: Apr. 29, 2022

(65) Prior Publication Data

US 2023/0351044 A1    Nov. 2, 2023

(51) Int. Cl.
| G06F 21/62 | (2013.01) |
| G06F 16/22 | (2019.01) |
| G06F 16/2455 | (2019.01) |
| G06F 21/60 | (2013.01) |

(52) U.S. Cl.
CPC ...... *G06F 21/6254* (2013.01); *G06F 16/2282* (2019.01); *G06F 16/24568* (2019.01); *G06F 21/602* (2013.01)

(58) Field of Classification Search
CPC . G06F 21/6254; G06F 16/2456; G06F 16/228
USPC .......................................................... 726/26
See application file for complete search history.

(56) References Cited

U.S. PATENT DOCUMENTS

| 8,407,194 B1* | 3/2013 | Chaput ................. G06F 21/552 |
| | | 707/694 |
| 10,055,747 B1* | 8/2018 | Sherman ............ G06F 21/6245 |
| 11,003,789 B1* | 5/2021 | Aggarwal ........... G06F 21/6245 |
| 11,270,279 B1* | 3/2022 | Rozovski ............... G06Q 20/14 |
| 2005/0038788 A1* | 2/2005 | Dettinger ............ G06F 21/6227 |
| 2018/0218069 A1* | 8/2018 | Rege ..................... G06F 16/337 |
| 2019/0089711 A1* | 3/2019 | Faulkner ............. H04L 63/1425 |
| 2020/0193018 A1* | 6/2020 | Van Dyke ............ G06F 21/552 |
| 2020/0320207 A1* | 10/2020 | Beno ....................... G06F 21/64 |
| 2020/0388380 A1* | 12/2020 | Romanychev ... G06K 19/06037 |
| 2022/0012363 A1* | 1/2022 | Colcord ............. G06F 16/2457 |
| 2022/0158982 A1* | 5/2022 | Greene ............... H04L 63/1441 |

OTHER PUBLICATIONS

Zinaida Apanovich; Experiments on using the LOD cloud datasets to enrich the content of a scientic knowledge base; ACM:2013; pp. 1-11.*

* cited by examiner

*Primary Examiner* — Monjur Rahim
(74) *Attorney, Agent, or Firm* — Schwegman Lundberg & Woessner, P.A.

(57) ABSTRACT

Provided herein are systems and methods for identity resolution and data enrichment. An example method performed by at least one hardware processor includes detecting at an account of a data provider, an update to personally identifiable information (PII). The PII is stored in a source table managed by an account of a data consumer. An identity resolution process is performed based on detecting the update. The identity resolution process includes generating a secure identifier of a user associated with the PII. The method further includes generating at the account of the data provider, a result table including the secure identifier. The result table is shared with the account of the data consumer.

30 Claims, 10 Drawing Sheets

IDENTITY RESOLUTION AND DATA ENRICHMENT FRAMEWORK

TECHNICAL FIELD

Embodiments of the disclosure relate generally to databases and, more specifically, to identity resolution and data enrichment framework that can be used in a cloud computing platform.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, client (or user) information (e.g., personally identifiable information, or PII) in that same or a different database. Example PII includes client names, client contact information, client address, and so forth. Based on different PII usage scenarios, the retail company may need to perform identity resolution and data enrichment of the client's PII. However, existing techniques for performing identity resolution and data enrichment are time-consuming and challenging to configure and perform securely.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
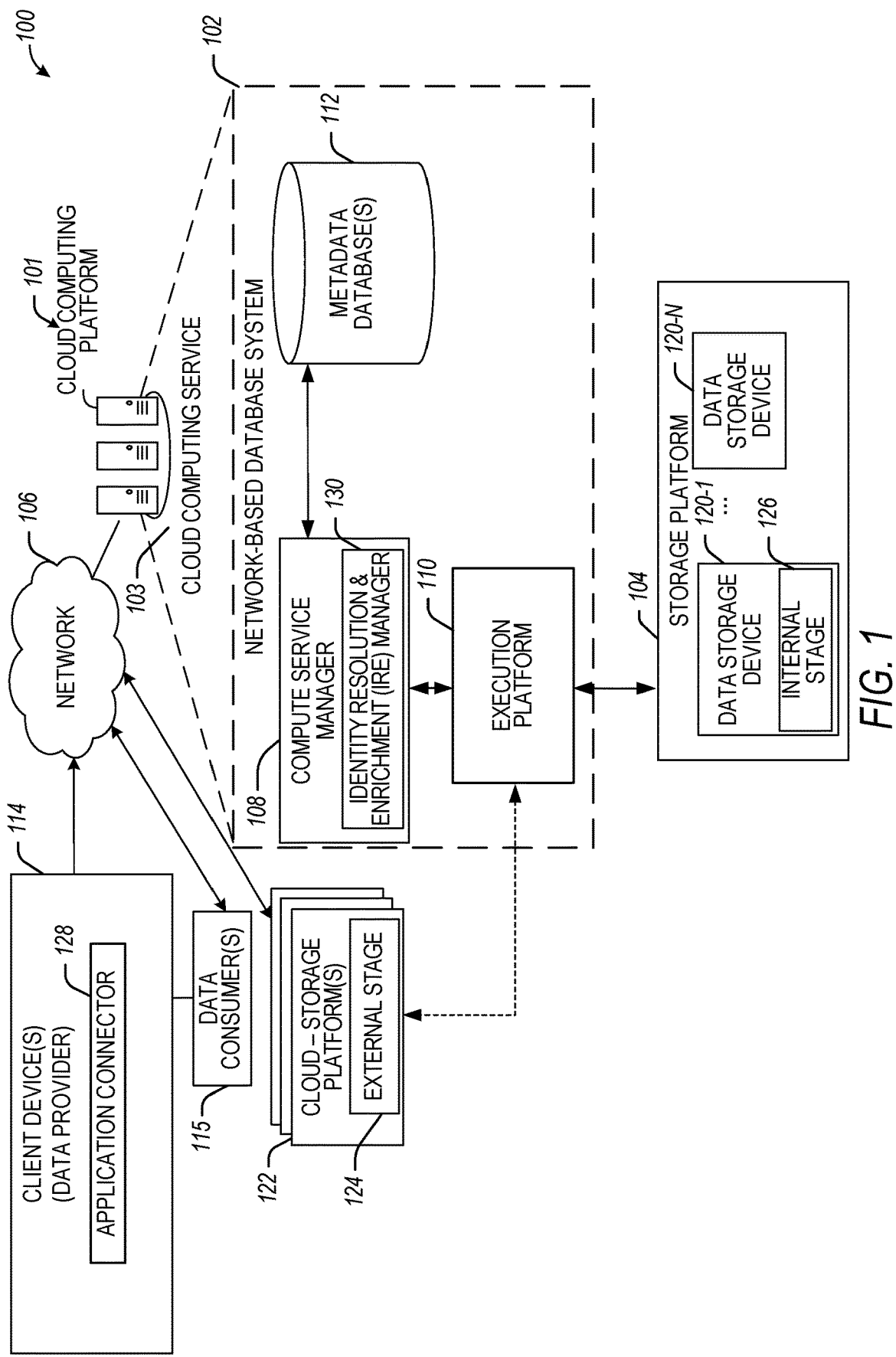
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As used herein, the term "table" indicates a mutable bag of rows, supporting time travel up to a retention period. As used herein, the term "view" indicates a named SELECT statement, conceptually similar to a table. In some aspects, a view can be secure, which prevents queries from getting information on the underlying data obliquely. As used herein, the term "materialized view" indicates a view that is eagerly computed rather than lazily (e.g., as a standard view). In some aspects, efficient implementation of materialized views has overlapped with change tracking functionality. As used herein, the term "stream" refers to a table and a timestamp. In some aspects, a stream may be used to iterate over changes to a table. When a stream is read inside a Data Manipulation Language (DML) statement, its timestamp may be transactionally advanced to the greater timestamp of its time interval.

As used herein, the term "identity resolution" refers to the process of matching fragments of personally identifiable information (PII) across devices and touchpoints to a single profile, often a person or a household. This profile aids in building a cohesive, multi-channel view of a consumer. An identity resolution process can generate a secure identifier (e.g., a secure key) of the person or household. As used herein, the term "data enrichment" refers to a process of obtaining additional data related to (and supplementing) an existing set of data (e.g., an existing set of PII).

As used herein, the term "task" indicates an object (e.g., a data object) that can execute (e.g., user-managed or managed by a network-based database system) any one of the following types of SQL code: a single SQL statement, a call to a stored procedure, and procedural logic using scripting.

Figure 2:
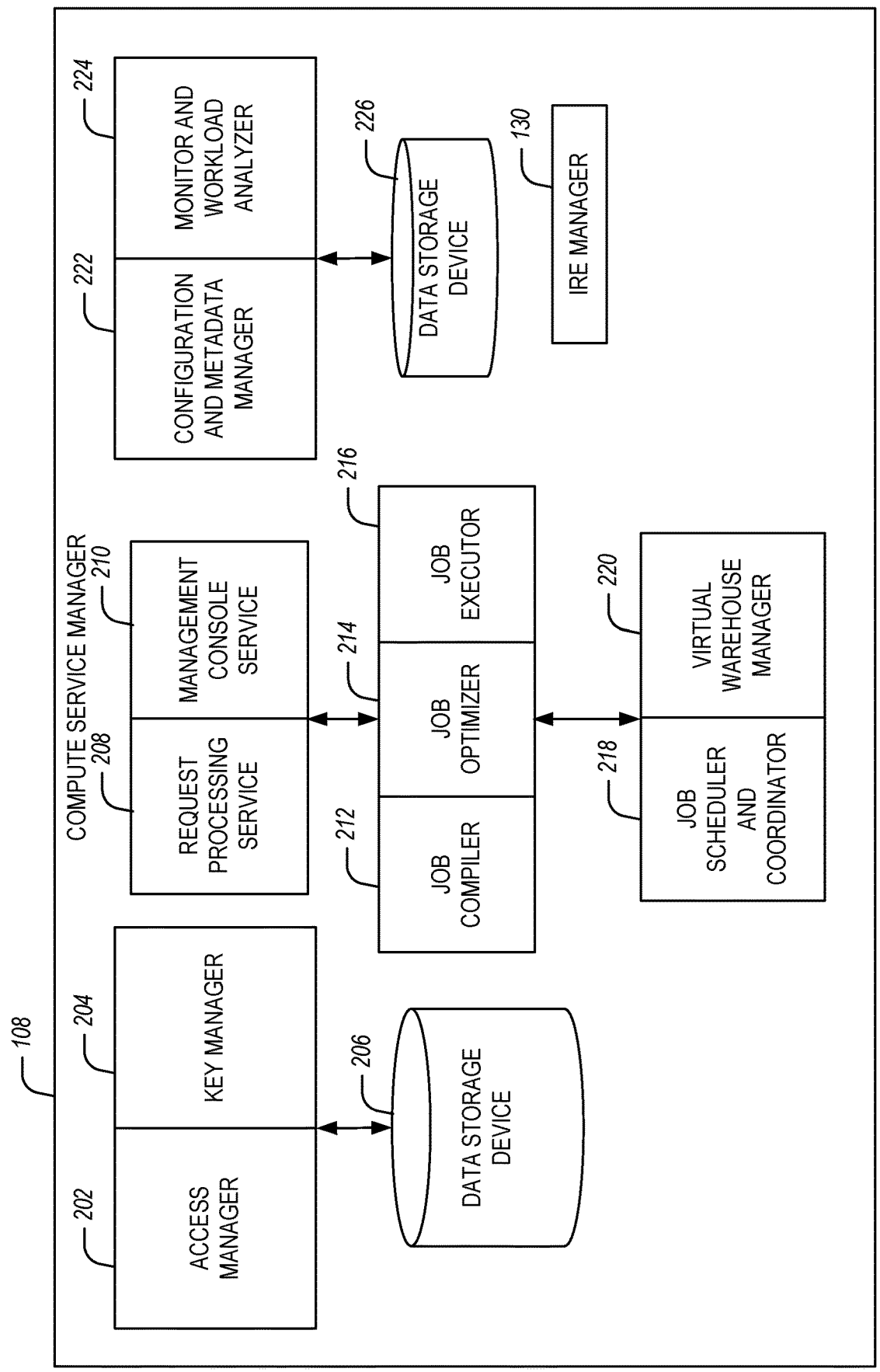
FIG. 2 is a block diagram illustrating the components of a compute service manager using an identity resolution and enrichment (IRE) manager, in accordance with some embodiments of the present disclosure.
Figure 3:
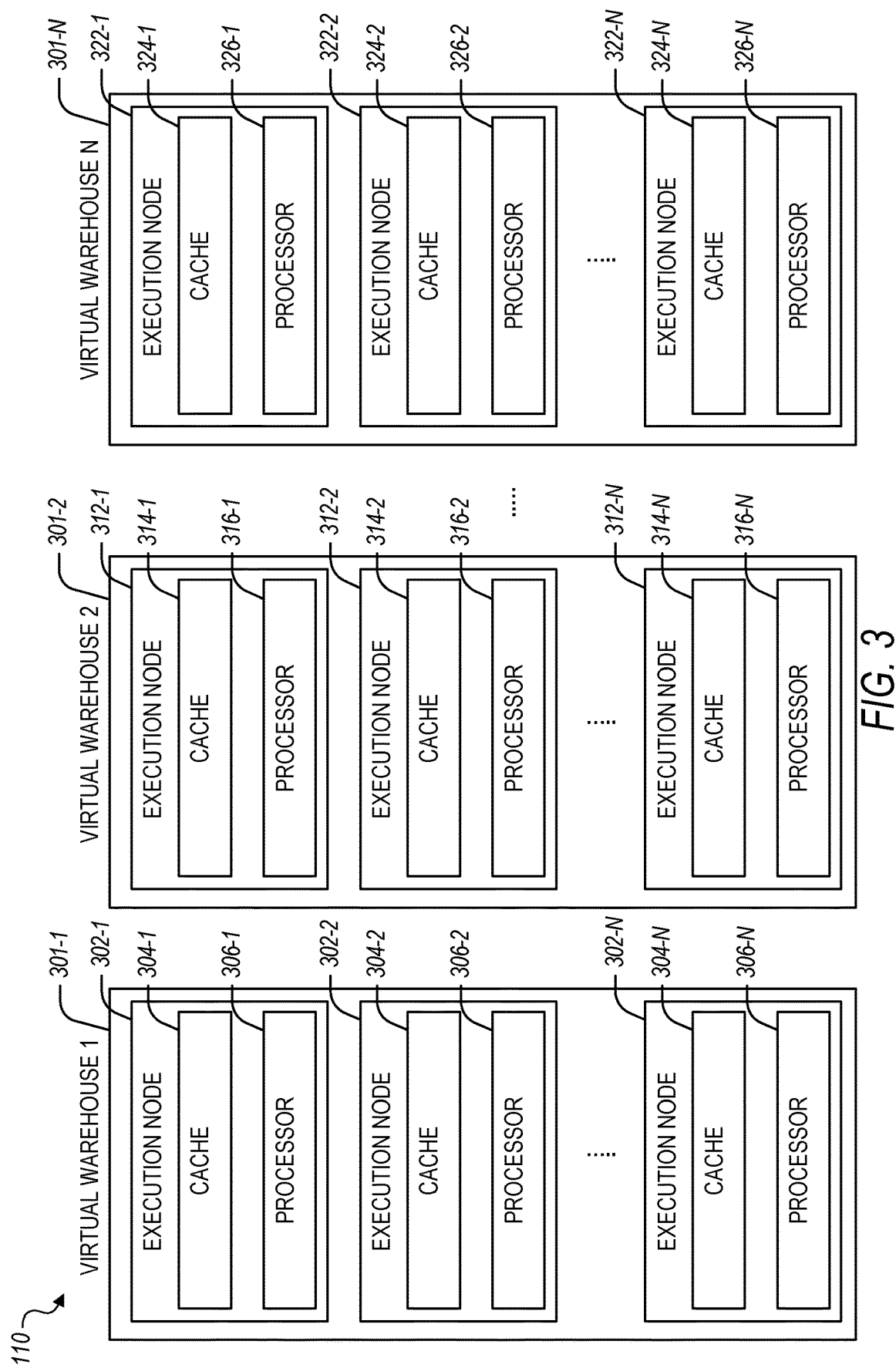
FIG. 3 is a block diagram illustrating components of an execution platform, in accordance with some embodiments of the present disclosure.

In some aspects, the disclosed identity resolution and data enrichment functionalities can exist in a network-based database system (e.g., as illustrated in FIGS. 1-3) or can be leveraged using an existing API (e.g., via one or more external functions). More specifically, the disclosed identity resolution and data enrichment techniques allow one party (e.g., a data consumer) to share PII data with an identity resolution provider (e.g., a data provider). Example features of the network-based database system which can be used in connection with identity resolution and data enrichment include configuring and using secure functions, data sharing, data streams (also referred to as streams), and tasks. Such features can work in concert to automate one or more aspects of the identity resolution and data enrichment functionalities.

The disclosed techniques can be used for configuring an identity resolution and enrichment (IRE) manager to perform identity resolution and data enrichment functionalities. There are two parties in an identity resolution process—a data provider and a data consumer (e.g., a customer/subscriber of services offered by the data provider). The data consumer has a data set with PII which needs identity resolution. The data provider can provide proprietary functionality that accomplishes identity resolution for identity information (e.g., PII of a user) submitted from the data consumer. Both the data consumer and the data provider can be tenants (or subscribers) of services provided by a network-based database system (e.g., services that can include the disclosed identity resolution and data enrichment functionalities of the IRE manager). In this regard, access to one or more of the disclosed identity resolution and data enrichment functionalities provided by an IRE manager can be configured (or enabled) in an account of the data provider or the data consumer at the network-based database system.

The various embodiments that are described herein are described with reference where appropriate to one or more of the various figures. An example computing environment using an IRE manager for configuring identity resolution and data enrichment functionalities is discussed in connection with FIGS. 1-3. Example stream-related configurations which can be used with the disclosed identity resolution and data enrichment functions are discussed in connection with FIGS. 4-6. Example identity resolution and data enrichment frameworks are discussed in connection with FIG. 7, FIG. 8, and FIG. 9. A more detailed discussion of example computing devices that may be used in connection with the disclosed techniques is provided in connection with FIG. 10.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and storage platforms 104 (also referred to as cloud storage platforms). The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., performing identity resolution and data enrichment functions described herein). The cloud computing platform 101 may include a three-tier architecture: data storage (e.g., storage platforms 104 and 122), an execution platform 110 (e.g., providing query processing), and a compute service manager 108 providing cloud services (e.g., identity resolution and data enrichment services provided by the IRE manager 130).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/ or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), client device 114 (e.g., a data provider), and data consumer 115 via network 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed identity resolution and data enrichment functions) to multiple client accounts, including an account of the data provider associated with client device 114 and an account of the data consumer 115. In some embodiments, the compute service manager 108 comprises the IRE manager 130 which can configure and provide the identity resolution and data enrichment functions to accounts of tenants of the network-based database system 102 (e.g., an account of the data provider associated with client device 114 and an account of the data consumer 115). A more detailed description of the identity resolution and data enrichment functions provided by the IRE manager 130 is provided in connection with FIGS. 4-9.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the network-based database system 102. The data provider may utilize application connector 128 at the client device 114 to submit data storage, retrieval, and analysis requests to the compute service manager 108 as well as to access other services provided by the compute service manager 108 (e.g., identity resolution and data enrichment functions). Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 115 can communicate with the client device 114 to access functions offered by the data provider. Additionally, the data consumer can access functions (e.g., identity resolution and data enrichment functions) offered by the network-based database system 102 via the network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks, such as network 106. These data communication networks may utilize any communication protocol and any type of communication medium. In some embodiments, the data communication networks are a combination of two or more data communication networks (or sub-Networks) coupled with one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials (e.g., credentials stored in one of the remote credential stores) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in the execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In some embodiments, the compute service manager 108 further includes the IRE manager 130 which can configure and provide the identity resolution and data enrichment functions to accounts of tenants of the network-based database system 102 (e.g., an account of the data provider associated with client device 114 and an account of the data consumer 115). A more detailed description of the identity resolution and data enrichment functions provided by the IRE manager 130 is provided in connection with FIGS. 4-9.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although each of the execution nodes shown in FIG. 3 includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
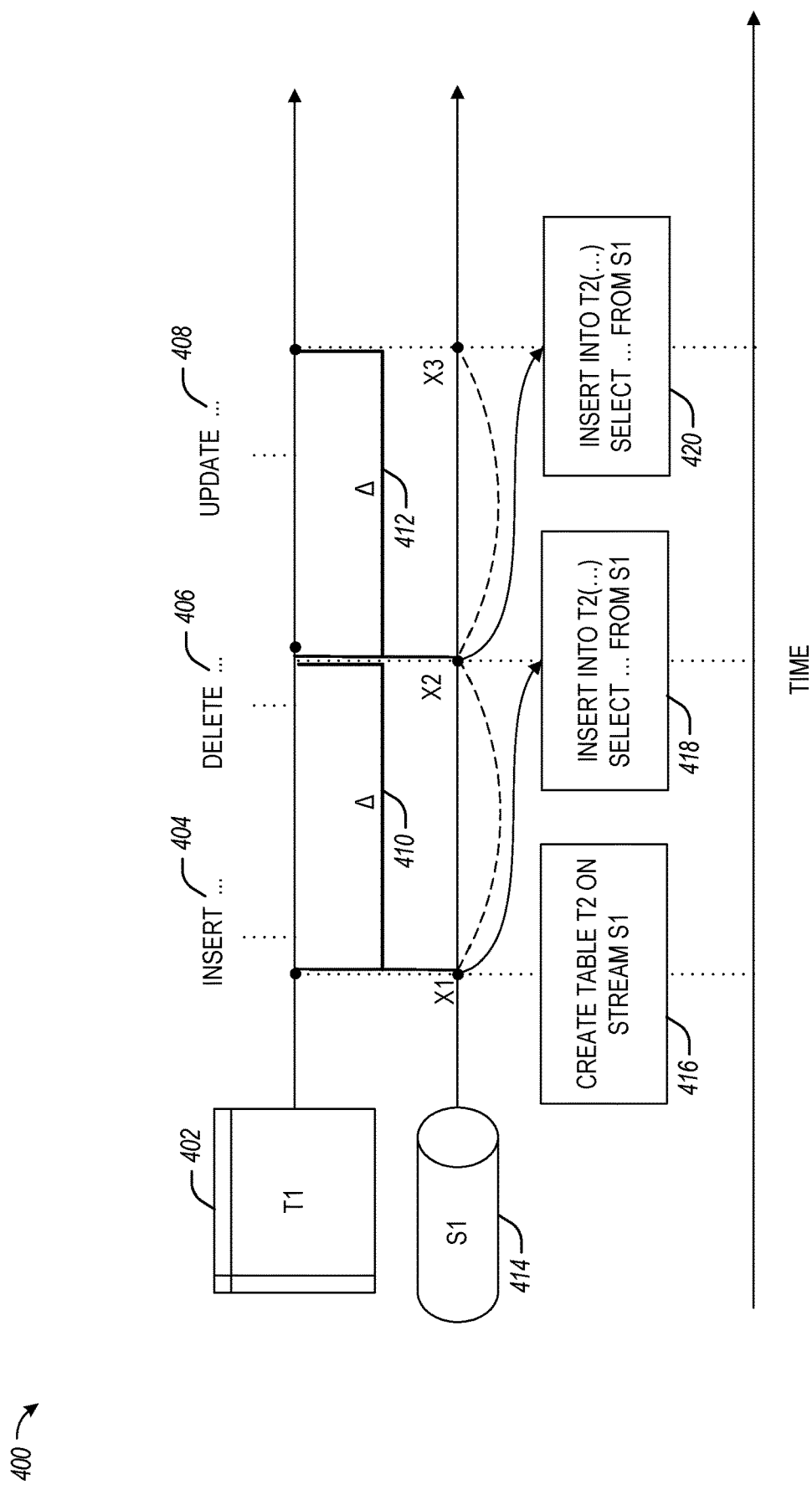
FIG. 4 is a diagram of a stream object configuration for a table, in accordance with some embodiments of the present disclosure.
Figure 5:
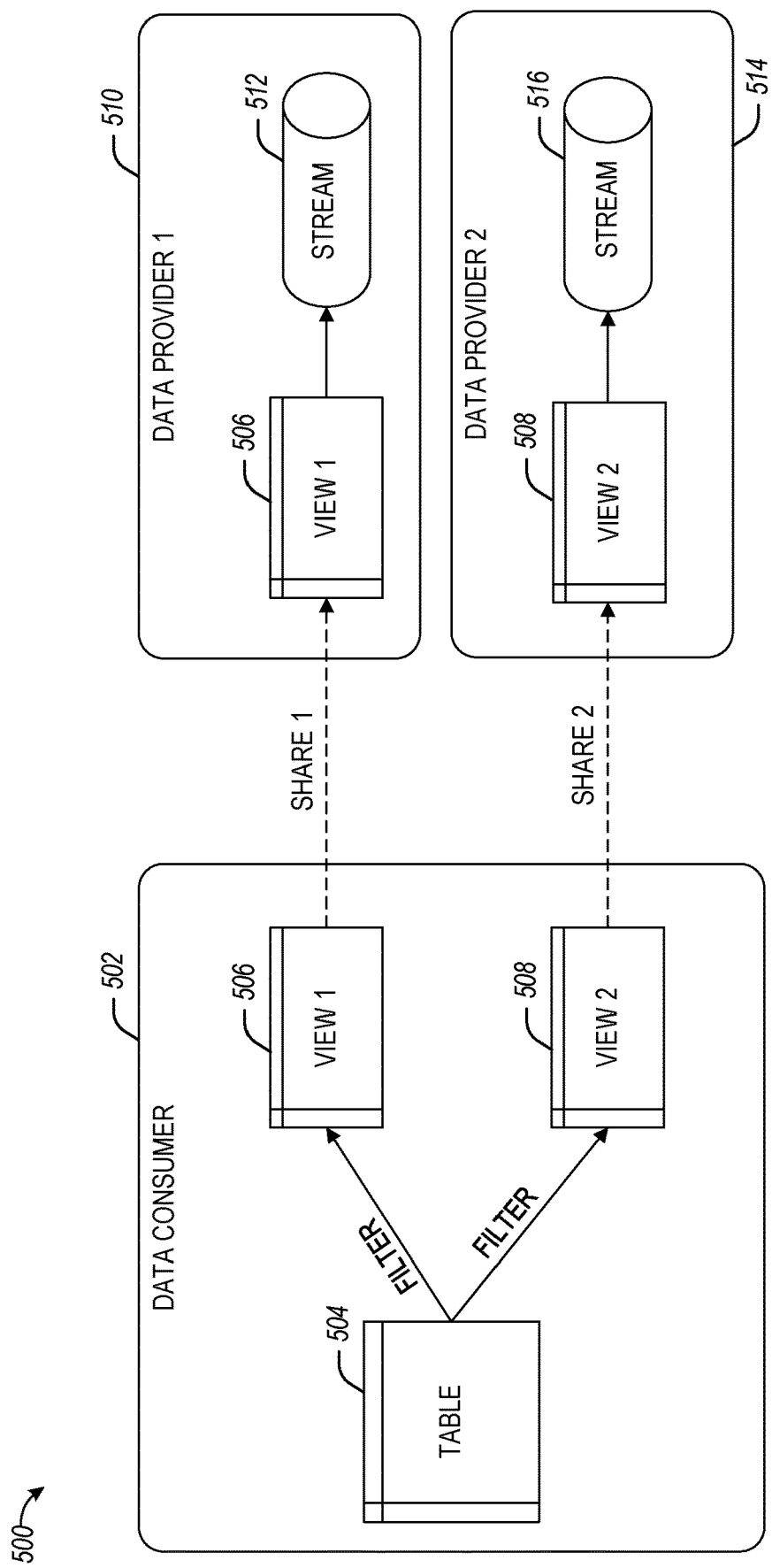
FIG. 5 is a diagram of shared views, in accordance with some embodiments of the present disclosure.
Figure 6:
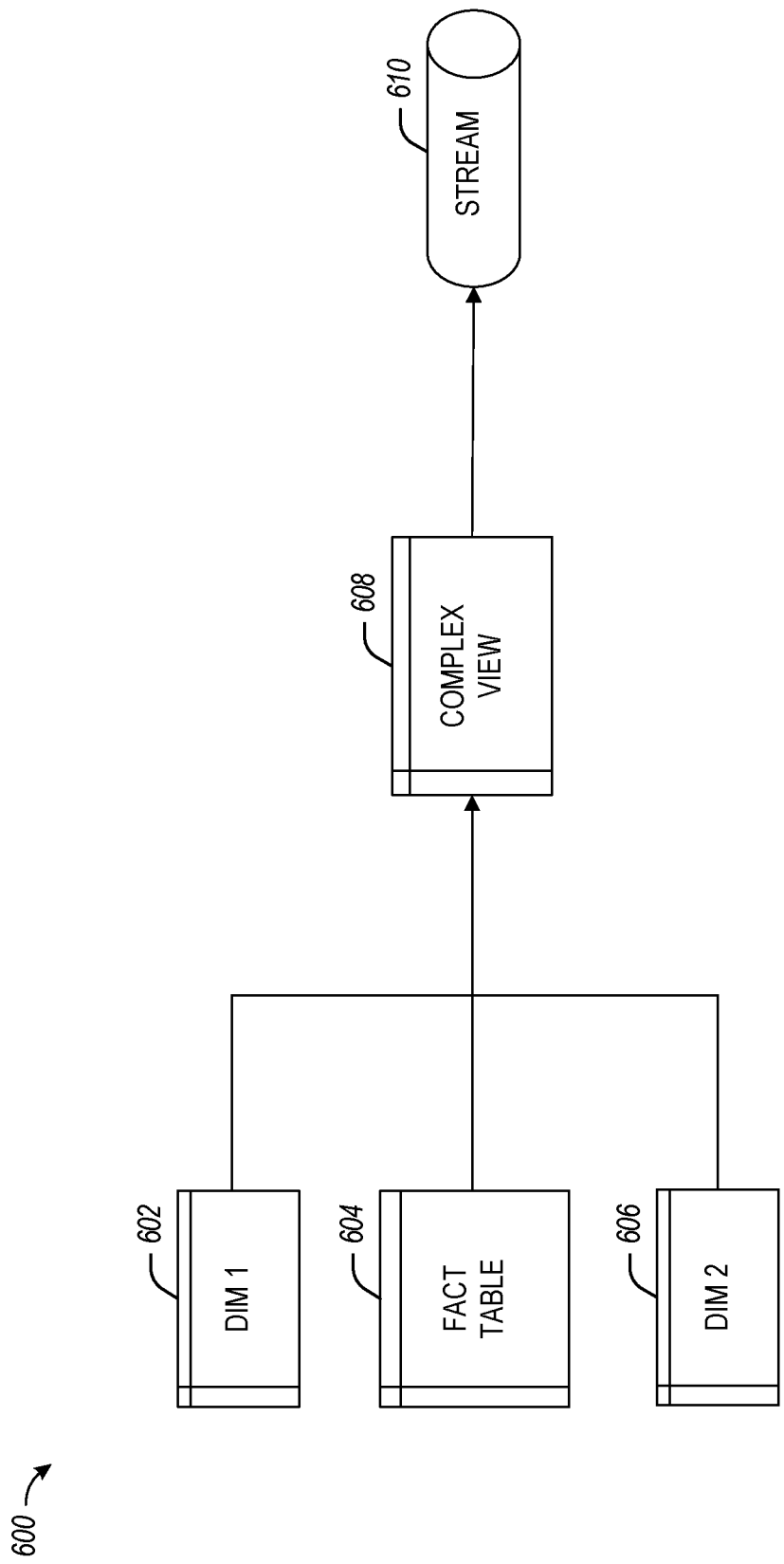
FIG. 6 is a diagram of a stream object based on a complex view, in accordance with some embodiments of the present disclosure.

FIGS. 4-6 describe aspects of secure sharing and configuring a stream (e.g., a stream on a view or a stream on a table), which can be used by the IRE manager 130 in connection with identity resolution and data enrichment functionalities performed in an account of a data consumer and an account of a data provider. The terms "stream" and "stream object" are used interchangeably.

FIG. 4 is diagram 400 of a stream object configuration for a table, in accordance with some embodiments of the present disclosure. Referring to FIG. 4, queries or data processing commands Insert 404, Delete 406, and Update 408 are applied to source table 402. As illustrated in FIG. 4, a stream 414 is generated on source table T1 402 at times X1, X2 (after a time interval of 410 from X1), and X3 (after a time interval of 412 from X2). Additionally, at operation 416, table T2 can be created on stream S1. At operation 418, a stream entry from stream S1 at time X1 is inserted into table T2. At operation 420, a stream entry from stream S1 at time X2 is inserted into table T2. In this regard, stream data on source table 402 can be isolated and stored in a separate table T2 for additional processing.

As used herein, the term "access control" indicates that customers can control who can access database objects within their organization. As used herein, the term "data sharing" indicates customers (e.g., data consumers or data providers) can grant access to database objects (e.g., a database table or a view in connection with identity resolution and data enrichment techniques disclosed herein) to other organizations (e.g., other data providers or other data consumers). In some aspects, any query with a CHANGES clause or a stream may be referred to as a change query. A change query on a view may be defined similarly.

In some embodiments, the IRE manager 130 is configured to provide changes to views (e.g., a stream on views) so that the changes may be further processed and acted on. More specifically, the IRE manager 130 may be configured to provide or process streams on views in connection with different use cases, such as shared views (e.g., as discussed in connection with FIG. 5) and complex views (e.g., as discussed in connection with FIG. 6). In some aspects, more than one use case may apply at a given time.

Shared (secure) views may be used to provide (e.g., a user or organization) limited access to sensitive data. The consumer of the data often wishes to observe changes to the data being shared with them. Some considerations implied by this use case include giving the consumer visibility into the shared view's retention period and how to enforce secure view limitations on change queries.

FIG. 5 is a diagram 500 of shared views, in accordance with some embodiments of the present disclosure. Referring to FIG. 5, a data consumer 502 manages a source table 504 (e.g., a source table with PII). The data consumer 502 can apply different filters to source table 504 to generate views 506 and 508. For example, data consumer 502 can apply different filters to source table 504 so that different PII from the table is shared with different data providers (e.g., data providers 510 and 514) in connection with identity resolution or data enrichment, based on specific privacy requirements of each of the data providers. In this regard, view 506 is shared with data provider 510, and view 508 is shared with data provider 514. In some embodiments, IRE manager 130 configures streams 512 and 516 on corresponding views 506 and 508 for consumption by data providers 510 and 514.

The definition of a view can be complex but observing the changes to such a view may be useful independently of its complexity. Manually constructing a query to compute those changes may be achieved, but can be toilsome, error-prone, and suffer from performance issues. In some aspects, a change query on a view may automatically rewrite the view query, relieving users of this burden. In some aspects, simple views containing only row-wise operators (e.g., select, project, union all) may be used. In some aspects, complex views that join fact tables with (potentially several) slowly-changing-dimension (DIM) tables may also be used. Other kinds of operators like aggregates, windowing functions, and recursion may also be used in connection with complex views.

FIG. 6 is a diagram 600 of a stream object based on a complex view, in accordance with some embodiments of the present disclosure. Referring to FIG. 6, a complex view 608 may be generated based on source tables 602, 604, and 606. In some aspects, source tables 602-606 can include different types of PII and enrichment data for a user (e.g., a customer of a data consumer or a data provider). In some embodiments, the IRE manager 130 configures a stream 610 (e.g., at an account of a data provider) based on the complex view 608 of source tables 602, 604, and 606.

Figure 7:
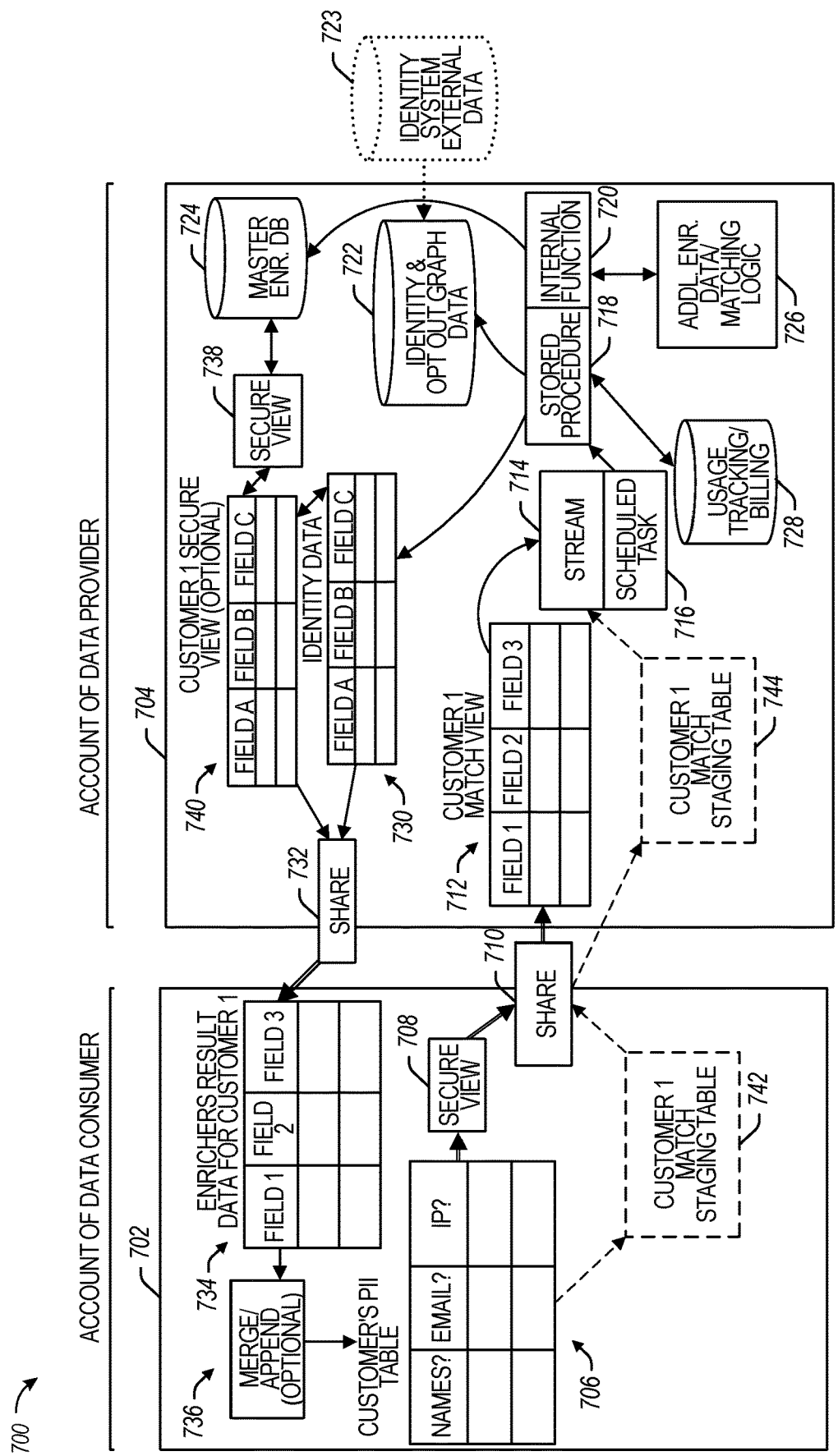
FIG. 7 is a block diagram illustrating identity resolution and data enrichment performed at an account of a data provider, in accordance with some embodiments of the present disclosure.

FIG. 7 is a block diagram 700 illustrating identity resolution and data enrichment performed at an account of a data provider, in accordance with some embodiments of the present disclosure. Referring to FIG. 7, identity resolution and data enrichment functions can be configured (e.g., by the IRE manager 130) to an account 702 of a data consumer and an account 704 of a data provider. More specifically, both the data consumer and the data provider can be customers (e.g., account holders) of the network-based database system 102. In the example of FIG. 7, the data provider account 704 is configured to perform identity resolution and data enrichment, and the data consumer account 702 is provisioned to use such functionalities.

Deployment of the identity resolution framework of FIG. 7 consists of creating secure objects and data shares in the data consumer account 702 and the data provider account 704. The framework can be flexible enough to incorporate additional functionality, as required. The framework can be deployed across two accounts on the same cloud provider and region. In the event the data provider and the data consumer are on different providers or regions, one of the parties can replicate their data/objects to the other party's provider or region.

In some aspects, the data consumer account 702 is provisioned to use the identity resolution and data enrichment functions configured for the data provider account 704. Once provisioned, the account of the data consumer can configure a source table 706 (also referred to as a consumer match table) with PII associated with a user (e.g., a customer of the data consumer or the data provider). The source table 706 can include a single record of PII associated with the user.

The data consumer account 702 further generates a secure view 708 of the source table 706 and a data share 710 to share the PII data with the data provider account 704. More specifically, a match view 712 (corresponding to the shared secure view 708) is configured at the data provider account 704. The requesting party (e.g., the data consumer account 702) can request the data provider account 704 to enable the identity resolution and data enrichment functionalities, or such functionalities can be enabled automatically based on the pre-configured subscription to services of the data provider.

Once the data consumer account 702 is enabled to use identity resolution functionalities of the data provider account 704, PII can be inserted/updated in the source table 706 (e.g., manually or automatically) which results in corresponding updates of the PII in the match view 712.

The data provider account 704 is configured with a stream object 714 (which can be user-specific) on the match view 712. In this regard, when the match view 712 updates due to changes in the source table 706 (e.g., new or revised PII associated with the user), the stream object 714 detects the updates (e.g., insertions or changes to the source table 706 and resulting changes in the secure view 708), which causes execution of the scheduled task 716. The scheduled task 716 initiates stored procedure 718 that orchestrates the processing of each PII record for identity resolution or data enrichment. More specifically, the stored procedure 718 can call on internal function 720 to perform identity resolution based on the updated PII detected by the stream object 714 in the match view 712.

In some embodiments, the stored procedure 718 further maintains a usage tracking and billing database 728 with information associated with the usage of the identity resolution and data enrichment functions by the data consumer.

During identity resolution, the internal function 720 can match the updated PII from view 712 with existing identity-related data using identity and opt-out graph database 722 to determine a user identity (or identity associated with a household of the user). The identity and opt-out graph database 722 can include identity-related data for users and user households, as well as opt-out information associated with such users or user households. In some aspects, identity resolution can also use identity-related data from external database 723.

During identity resolution, for each user/consumer PII record obtained via the match view 712, one or more secure identifiers (e.g., keys) can be generated by the internal function 720. In some aspects, the internal function 720 further encrypts the generated one or more secure identifiers using a user-specific encryption passphrase. The one or more secure identifiers associated with the user are stored in a result table 730 at the data provider account 704. The result table 730 is shared back to a corresponding result table 734 at the data consumer account 702 via data share 732.

In some embodiments, after identity resolution is performed, the internal function 720 can further perform data enrichment to generate additional data (also referred to as enrichment data) for the user (or the user's household) associated with the one or more secure identifiers generated during the identity resolution. More specifically, the internal function can use the master enrichment database 724 (which stores enrichment data for users and user households) to obtain enrichment data for the user (or the user's household) associated with the one or more secure identifiers generated during the identity resolution. In some aspects, the internal function 720 further uses the additional enrichment data/matching logic 726 to perform data matching and obtain additional enrichment data (e.g., using one or more databases of the data provider or one or more external databases the data provider has access to). The determined enrichment data can be stored in additional result table 740 via a secure view 738. Enrichment data stored at the additional result table 740 is shared into the result table 734 of the data consumer account 702 via data share 732.

In some aspects, identity resolution and data enrichment information generated by the internal function 720 can be further revised (e.g., edited or not provided to the data consumer account 702) based on opt-out information obtained from the identity and opt-out graph database 722 (e.g., when the user has opted out from sharing of the user's PII or the user's household PII with third parties).

In some aspects, the data consumer account 702 can be configured with a merge/append function 736, which can be used to merge identity resolution data (as well as enrichment data if available) stored in the result table 734 with the PII stored in source table 706.

In some embodiments, the data provider account 704 can configure the stream object 714 on a staging table instead of a view. In this regard, the data consumer account 702 can use a task that holds the PII in a staging table 742, where the task can execute at a pre-configured interval. The staging table 742 at the data consumer account 702 is shared to a staging table 744 at the data provider account 704 via the data share 710. The stream object 714 can be associated with the staging table 744 at the data provider account 704.

In some embodiments, to ensure continual identity resolution, the data consumer account 702 can automate an Extract, Transform, and Load (ETL) or an Extract, Load, and Transform (ELT) process to load data into the staging table 742 on a desired cadence. In some aspects, if ad-hoc identity resolution is desired, a stored procedure can be configured for loading data into staging table 742 or the source table 706. The stored procedure can also execute the ETL/ELT process referenced above. In some aspects, if the data provider's identity resolution process requires additional data not available at the data provider account 704, the data provider can automate an ETL/ELT process to load external data into the data provider account 704.

Figure 8:
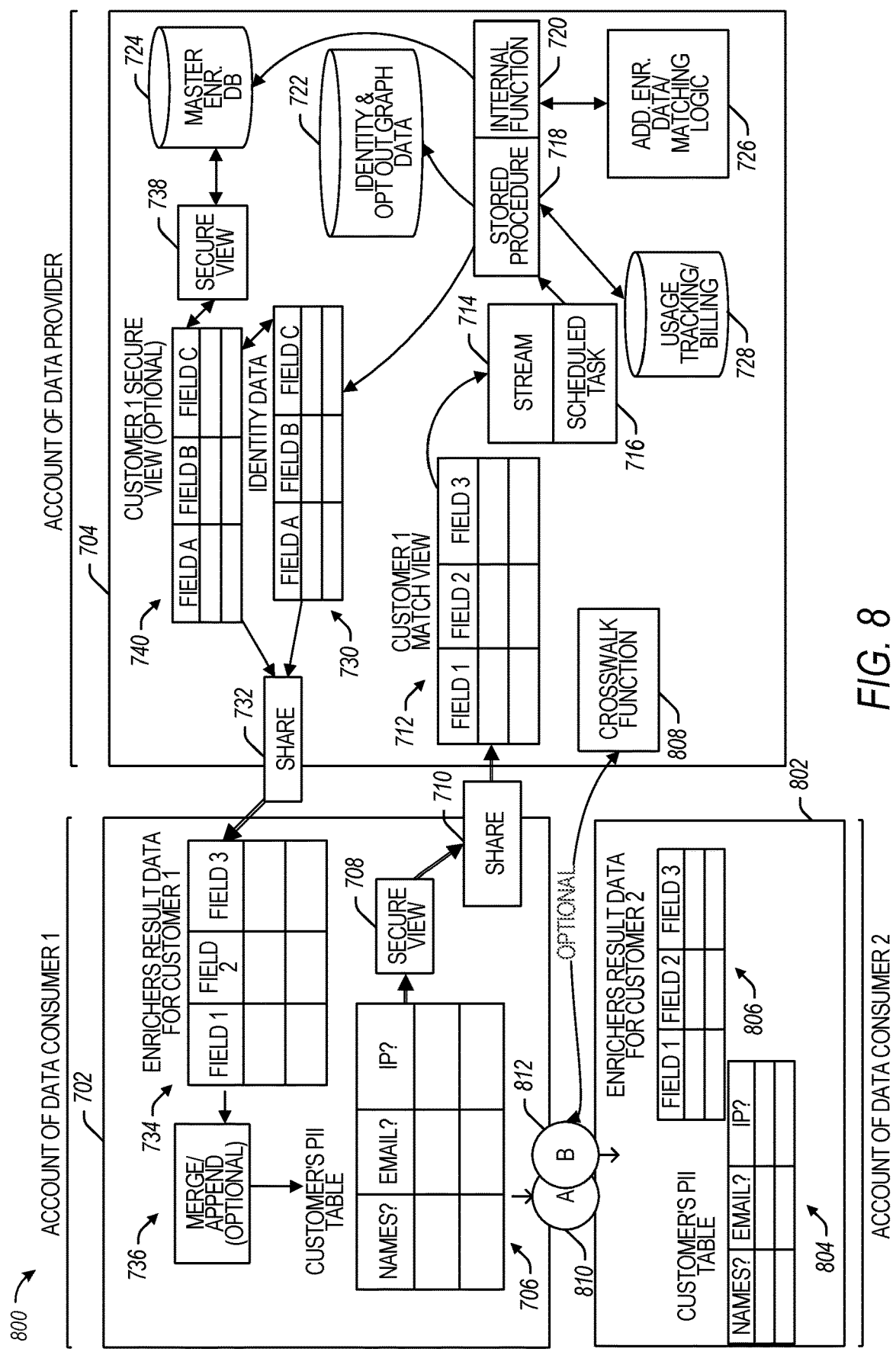
FIG. 8 is a block diagram illustrating brokering the exchange of data between accounts of data consumers using a crosswalk function of a data provider, in accordance with some embodiments of the present disclosure.

FIG. 8 is a block diagram 800 illustrating brokering the exchange of data between accounts of data consumers using a crosswalk function of a data provider, in accordance with some embodiments of the present disclosure. FIG. 8 illustrates the identity resolution and data enrichment functionalities associated with the data consumer account 702 and the data provider account 704 (as described above in connection with FIG. 7).

After identity resolution is performed, the data provider returns a secure key (or a set of keys) that can represent a different component of user identity information (e.g., user's PII). Once the data provider account 704 returns the secure key(s) generated during the identity resolution procedure, the data consumer can use the secure key(s) to access additional demographic information (or other enrichment data not available at the data consumer account 702) about the user identity or use the secure key(s) to obtain additional enrichment data from a second data consumer account 802 (associated with the same data provider account 704) or provide enrichment data to the second data consumer account 802 for joining their data sets.

More specifically, the data provider account 704 can detect a request 810 for additional PII of the user, with the request 810 communicated by the data consumer account 702 to the account 802 of the second data consumer. The request 810 can include the secure identifier (e.g., the secure key(s)) of the user. The data provider account (e.g., the internal function 720 or the crosswalk function 808) can retrieve a second secure identifier of the user, where the second secure identifier is generated based on a second identity resolution process for the account 802 of the second data consumer. More specifically, the second identity resolution process is performed at the data provider account 704 based on an update of the PII of the user at the account 802 of the second data consumer. The crosswalk function 808 of the data provider account 704 can be configured to replace the secure identifier in request 810 with the second secure identifier to generate a revised request 812. The revised request 812 is forwarded to account 802 of the second data consumer. Account 802 can retrieve PII information from the source table 804 or enrichment data from the result table 806 and may forward such retrieved data back to the data consumer account 702. In this regard, the data provider acts as a "broker" that provides functionality (e.g., the internal function 720 and the crosswalk function 808) which facilitates the joining of the datasets between data consumers. In some aspects, data consumers associated with accounts 702 and 802 are customers of the data provider and can be configured in a data clean room (DCR) in connection with the above functionalities illustrated in FIG. 8.

Figure 9:
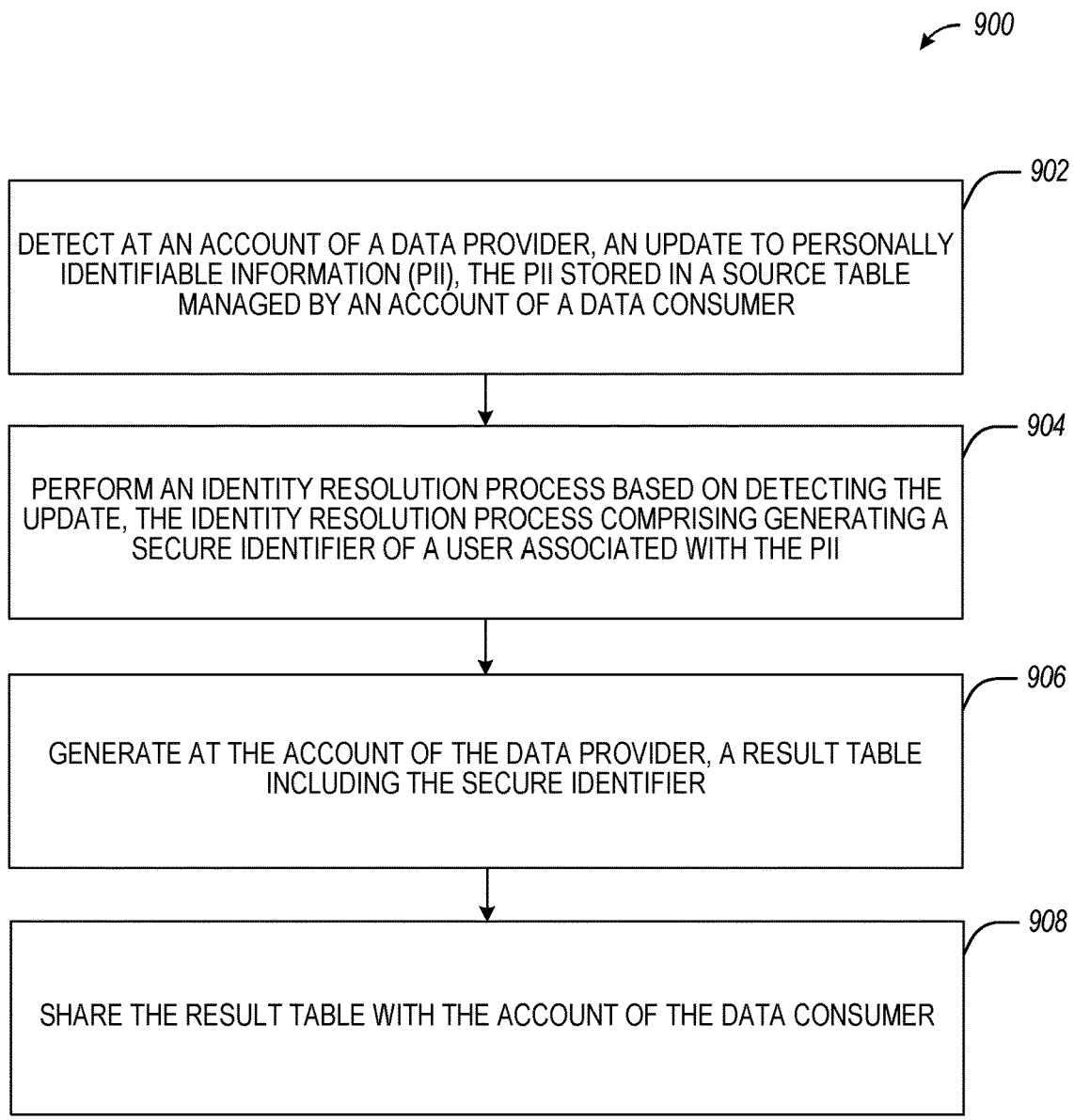
FIG. 9 is a flow diagram illustrating operations of a database system in performing a method for identity resolution, in accordance with some embodiments of the present disclosure.

FIG. 9 is a flow diagram illustrating operations of a database system in performing a method 900 for identity resolution, in accordance with some embodiments of the present disclosure. Method 900 may be embodied in computer-readable instructions for execution by one or more hardware components (e.g., one or more processors) such that the operations of the method 900 may be performed by components of network-based database system 102, such as components of the compute service manager 108 (e.g., the IRE manager 130) and/or the execution platform 110 (e.g., which components may be implemented as machine 1000 of FIG. 10). Accordingly, method 900 is described below, by way of example with reference thereto. However, it shall be appreciated that method 900 may be deployed on various other hardware configurations and is not intended to be limited to deployment within the network-based database system 102.

At operation 902, an update to personally identifiable information (PII) is detected at an account of a data provider. For example, the PII is associated with a user and is stored in a source table 706 managed by the data consumer account 702. An update to the PII in the source table 706 is detected via stream object 714 on match view 712 (associated with shared view 708 of the source table 706).

At operation 904, an identity resolution process is performed based on detecting the update. For example and as described above in connection with FIG. 7, the identity resolution process is performed by the internal function 720 of the data provider account 704. The identity resolution process includes generating a secure identifier of the user associated with the PII.

At operation 906, a result table (e.g., result table 730) including the secure identifier is generated at the account of the data provider.

At operation 908, the result table is shared with the account of the data consumer. For example, the result table 730 is shared back to a corresponding result table 734 at the data consumer account 702 via data share 732.

The disclosed techniques can be used to replace some slower and less secure identity resolution and data enrichment methods. Such methods are based on compiling desired data, writing that data to a flat, delimited file, then uploading the file to a secure file transfer protocol (sFTP) location. Once received, the data provider copies the file, processes the data, then returns an output file to the sFTP location, for the requesting party to download. Once downloaded, the requesting party has to ingest the results into databases. Advantages of the disclosed identity resolution and data enrichment techniques over such methods include:
  (a) When both the providing and requesting parties' data is in the network-based database system, the requesting party can securely share their data with the provider via secure data sharing.
  (b) Data does not need to be extracted and transferred, and the data remains in each party's account.
  (c) Data access can be fully revocable. While other technologies allow for stopping data sharing, such technologies do not allow for full access revocation. With secure data sharing, the disclosed techniques can be used to completely remove access to the data, improving compliance with industry regulations like the Right to Erasure.
  (d) Other security features, such as row access policies can be integrated with the disclosed techniques.
  (e) The data provider's matching/enrichment logic can be migrated into the network-based database system using stored procedures that support multiple languages.
  (f) The disclosed techniques can also be integrated into a Data Clean Room (DCR), where DCR parties can join on the results from identity resolution and data enrichment (e.g., as discussed in connection with FIG. 8).
  (g) The end-to-end process can be completely automated using streams and tasks (e.g., as discussed in connection with FIGS. 4-7).

Figure 10:
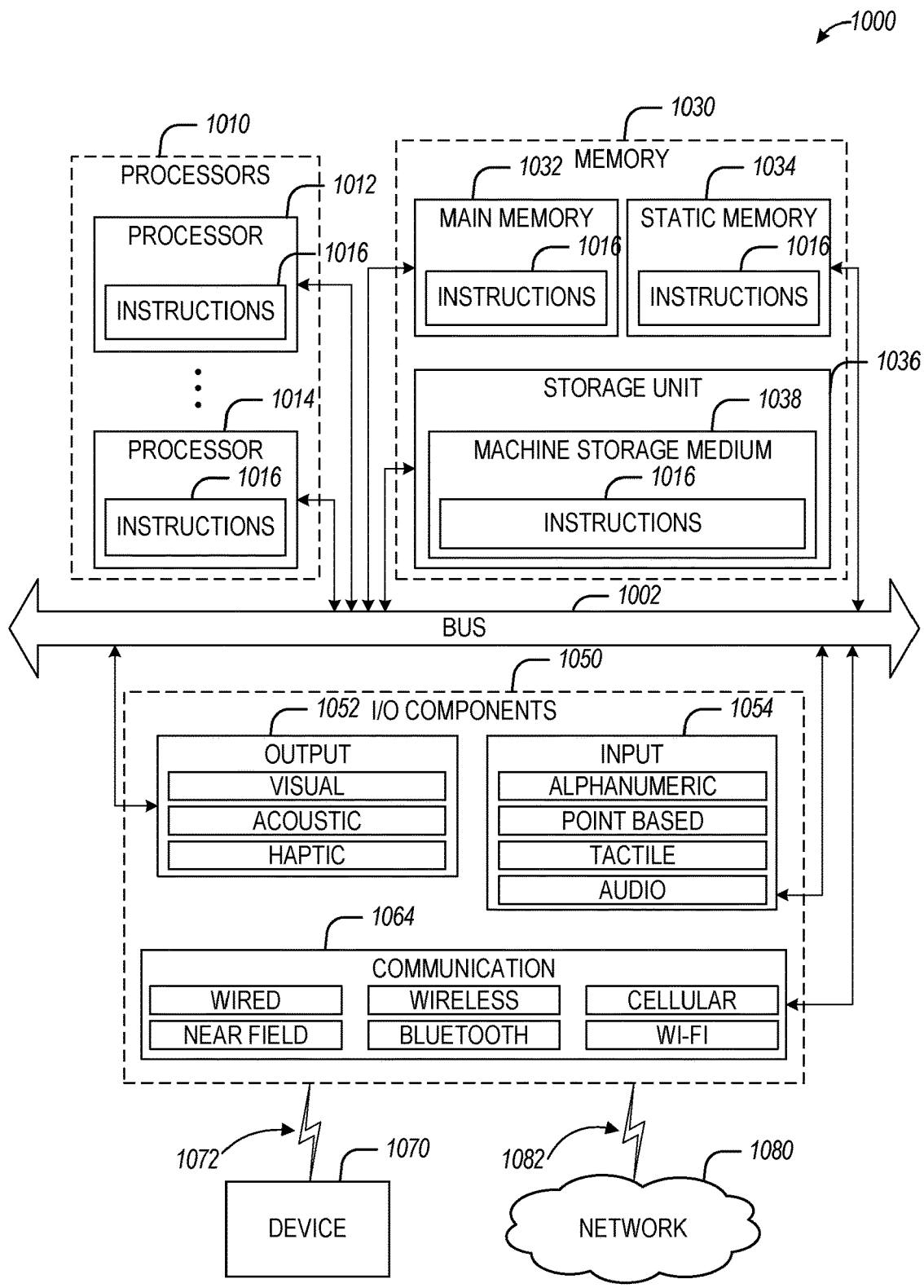
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, instructions 1016 may cause machine 1000 to execute any one or more operations of method 900 (or any other technique discussed herein, for example in connection with FIG. 4-FIG. 9). As another example, instructions 1016 may cause machine 1000 to implement one or more portions of the functionalities discussed herein. In this way, instructions 1016 may transform a general, non-programmed machine into a particular machine 1000 (e.g., the compute service manager 108 or a node in the execution platform 110) that is specially configured to carry out any one of the described and illustrated functions in the manner described herein. In yet another embodiment, instructions 1016 may configure the compute service manager 108 and/or a node in the execution platform 110 to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

Machine 1000 includes processors 1010, memory 1030, and input/output (I/O) components 1050 configured to communicate with each other such as via a bus 1002. In some example embodiments, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within machine storage medium 1038 of the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touches gestures or other tactile input components), audio input components (e.g., a microphone), and the like.

Communication may be implemented using a wide variety of technologies. The I/O components 1050 may include communication components 1064 operable to couple the machine 1000 to a network 1080 or device 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The device 1070 may be another machine or any of a wide variety of peripheral devices (e.g., a peripheral device coupled via a universal serial bus (USB)). For example, as noted above, machine 1000 may correspond to any one of the compute service manager 108 or the execution platform 110, and the device 1070 may include the client device 114 or any other computing device described herein as being in communication with the network-based database system 102, the storage platform 104, or the cloud storage platforms 122.

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of several well-known transfer protocols (e.g., hypertext transfer protocol (HTTP)). Similarly, instructions 1016 may be transmitted or received using a transmission medium via the coupling 1072 (e.g., a peer-to-peer coupling) to the device 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of some of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: detecting at an account of a data provider, an update to personally identifiable information (PII), the PII stored in a source table managed by an account of a data consumer; performing an identity resolution process based on detecting the update, the identity resolution process comprising generating a secure identifier of a user associated with the PII; generating at the account of the data provider, a result table including the secure identifier; and sharing the result table with the account of the data consumer.

In Example 2, the subject matter of Example 1 includes subject matter where the instructions further cause the at least one hardware processor to perform operations comprising: encrypting the secure identifier with an encryption key associated with the user.

In Example 3, the subject matter of Examples 1-2 includes subject matter where the instructions further cause the at least one hardware processor to perform operations comprising: causing at the account of the data consumer, a merge of the result table with the source table.

In Example 4, the subject matter of Examples 1-3 includes subject matter where the instructions further cause the at least one hardware processor to perform operations comprising: configuring at the account of the data provider, a stream object on a view of the source table.

In Example 5, the subject matter of Example 4 includes subject matter where the instructions further cause the at least one hardware processor to perform operations comprising: detecting the update to the PII using the stream object on the view of the source table.

In Example 6, the subject matter of Examples 1-5 includes subject matter where the instructions further cause the at least one hardware processor to perform operations comprising: performing a data enrichment process to obtain enrichment data associated with the user, the enrichment data comprising additional PII that is supplemental to the PII stored in the source table.

In Example 7, the subject matter of Example 6 includes subject matter where the instructions for performing the data enrichment process further cause the at least one hardware processor to perform operations comprising: retrieving the enrichment data from an enrichment database of the data provider based on the secure identifier of the user.

In Example 8, the subject matter of Examples 6-7 includes subject matter where the instructions further cause the at least one hardware processor to perform operations comprising: updating the result table with the enrichment data associated with the user.

In Example 9, the subject matter of Examples 1-8 includes subject matter where the instructions further cause the at least one hardware processor to perform operations comprising: detecting a request for additional PII of the user, the request communicated by the account of the data consumer to an account of a second data consumer, and the request including the secure identifier of the user.

In Example 10, the subject matter of Example 9 includes subject matter where the instructions further cause the at least one hardware processor to perform operations comprising: retrieving a second secure identifier of the user, the second secure identifier generated based on a second identity resolution process, and the second identity resolution process performed at the account of the data provider based on an update of PII of the user at the account of the second data consumer; replacing the secure identifier in the request with the second secure identifier to generate a revised request and forwarding the revised request to the account of the second data consumer.

Example 11 is a method comprising: performing by at least one hardware processor: detecting at an account of a data provider, an update to personally identifiable information (PII), the PII stored in a source table managed by an account of a data consumer; performing an identity resolution process based on detecting the update, the identity resolution process comprising generating a secure identifier of a user associated with the PII; generating at the account of the data provider, a result table including the secure identifier; and sharing the result table with the account of the data consumer.

In Example 12, the subject matter of Example 11 includes, encrypting the secure identifier with an encryption key associated with the user.

In Example 13, the subject matter of Examples 11-12 includes, causing at the account of the data consumer, a merge of the result table with the source table.

In Example 14, the subject matter of Examples 11-13 includes, configuring at the account of the data provider, a stream object on a view of the source table.

In Example 15, the subject matter of Example 14 includes, detecting the update to the PII using the stream object on the view of the source table.

In Example 16, the subject matter of Examples 11-15 includes, performing a data enrichment process to obtain enrichment data associated with the user, the enrichment data comprising additional PII that is supplemental to the PII stored in the source table.

In Example 17, the subject matter of Example 16 includes subject matter where performing the data enrichment process further comprises: retrieving the enrichment data from an enrichment database of the data provider based on the secure identifier of the user.

In Example 18, the subject matter of Examples 16-17 includes, updating the result table with the enrichment data associated with the user.

In Example 19, the subject matter of Examples 11-18 includes, detecting a request for additional PII of the user, the request communicated by the account of the data consumer to an account of a second data consumer, and the request including the secure identifier of the user.

In Example 20, the subject matter of Example 19 includes, retrieving a second secure identifier of the user, the second secure identifier generated based on a second identity resolution process, and the second identity resolution process performed at the account of the data provider based on an update of PII of the user at the account of the second data consumer; replacing the secure identifier in the request with the second secure identifier to generate a revised request, and forwarding the revised request to the account of the second data consumer.

Example 21 is a computer-storage medium comprising instructions that, when executed by one or more processors of a machine, configure the machine to perform operations comprising: detecting at an account of a data provider, an update to personally identifiable information (PII), the PII stored in a source table managed by an account of a data consumer; performing an identity resolution process based on detecting the update, the identity resolution process comprising generating a secure identifier of a user associated with the PII; generating at the account of the data provider, a result table including the secure identifier; and sharing the result table with the account of the data consumer.

In Example 22, the subject matter of Example 21 includes, the operations further comprising: encrypting the secure identifier with an encryption key associated with the user.

In Example 23, the subject matter of Examples 21-22 includes, the operations further comprising: causing at the account of the data consumer, a merge of the result table with the source table.

In Example 24, the subject matter of Examples 21-23 includes, the operations further comprising: configuring at the account of the data provider, a stream object on a view of the source table.

In Example 25, the subject matter of Example 24 includes, the operations further comprising: detecting the update to the PII using the stream object on the view of the source table.

In Example 26, the subject matter of Examples 21-25 includes, the operations further comprising: performing a data enrichment process to obtain enrichment data associated with the user, the enrichment data comprising additional PII that is supplemental to the PII stored in the source table.

In Example 27, the subject matter of Example 26 includes subject matter where the operations for performing the data enrichment process further comprising: retrieving the enrichment data from an enrichment database of the data provider based on the secure identifier of the user.

In Example 28, the subject matter of Examples 26-27 includes, the operations further comprising: updating the result table with the enrichment data associated with the user.

In Example 29, the subject matter of Examples 21-28 includes, the operations further comprising: detecting a request for additional PII of the user, the request communicated by the account of the data consumer to an account of a second data consumer, and the request including the secure identifier of the user.

In Example 30, the subject matter of Example 29 includes, the operations further comprising: retrieving a second secure identifier of the user, the second secure identifier generated based on a second identity resolution process, and the second identity resolution process performed at the account of the data provider based on an update of PII of the user at the account of the second data consumer; replacing the secure identifier in the request with the second secure identifier to generate a revised request; and forwarding the revised request to the account of the second data consumer.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    at least one memory storing instructions that cause the at least one hardware processor to perform operations comprising:
        generating, at an account of a data provider, a view object of personally identifiable information (PII), the PII stored in a source table managed by an account of a data consumer and shared with the account of the data provider via a share object and a second view object at the account of the data consumer;
        detecting using a stream object at the account of the data provider, an update to the PII stored in the view object;
        performing an identity resolution process based on detecting the update to the PII stored in the view object, the identity resolution process comprising generating a secure identifier of a user associated with the PII, and the identity resolution process initiated by a stored procedure at the account of the data provider based on the detecting;
        generating at the account of the data provider, a result table including the secure identifier; and
        sharing the result table with the account of the data consumer.

2. The system of claim 1, wherein the instructions further cause the at least one hardware processor to perform operations comprising:
    encrypting the secure identifier with an encryption key associated with the user.

3. The system of claim 1, wherein the instructions further cause the at least one hardware processor to perform operations comprising:
    causing at the account of the data consumer, a merge of the result table with the source table.

4. The system of claim 1, wherein the instructions further cause the at least one hardware processor to perform operations comprising:
    configuring at the account of the data provider, the stream object to include a plurality of updates of the view object and a corresponding plurality of time stamps associated with times the plurality of updates are obtained.

5. The system of claim 4, wherein the instructions further cause the at least one hardware processor to perform operations comprising:
    initiating the identity resolution process using a scheduled task at the account of the data provider, the initiating based on the stream object detecting an update of the plurality of updates to the view object.

6. The system of claim 1, wherein the instructions further cause the at least one hardware processor to perform operations comprising:
    performing a data enrichment process to obtain enrichment data associated with the user, the enrichment data comprising additional PII that is supplemental to the PII stored in the source table.

7. The system of claim 6, wherein the instructions for performing the data enrichment process further cause the at least one hardware processor to perform operations comprising:
    retrieving the enrichment data from an enrichment database of the data provider based on the secure identifier of the user.

8. The system of claim 6, wherein the instructions further cause the at least one hardware processor to perform operations comprising:
    updating the result table with the enrichment data associated with the user.

9. The system of claim 1, wherein the instructions further cause the at least one hardware processor to perform operations comprising:
    detecting a request for additional PII of the user, the request communicated by the account of the data consumer to an account of a second data consumer, and the request including the secure identifier of the user.

10. The system of claim 9, wherein the instructions further cause the at least one hardware processor to perform operations comprising:
    retrieving a second secure identifier of the user, the second secure identifier generated based on a second identity resolution process, and the second identity resolution process performed at the account of the data provider based on an update of PII of the user at the account of the second data consumer;
    replacing the secure identifier in the request with the second secure identifier to generate a revised request; and
    forwarding the revised request to the account of the second data consumer.

11. A method comprising:
    performing by at least one hardware processor operations comprising:
        generating, at an account of a data provider, a view object of personally identifiable information (PII), the PII stored in a source table managed by an account of a data consumer and shared with the account of the data provider via a share object and a second view object at the account of the data consumer;
        detecting using a stream object at the account of the data provider, an update to the PII stored in the view object;
        performing an identity resolution process based on detecting the update to the PII stored in the view object, the identity resolution process comprising generating a secure identifier of a user associated with the PII, and the identity resolution process initiated by a stored procedure at the account of the data provider based on the detecting;
        generating at the account of the data provider, a result table including the secure identifier; and
        sharing the result table with the account of the data consumer.

12. The method of claim 11, further comprising:
    encrypting the secure identifier with an encryption key associated with the user.

13. The method of claim 11, further comprising:
causing at the account of the data consumer, a merge of the result table with the source table.

14. The method of claim 11, further comprising:
configuring at the account of the data provider, the stream object to include a plurality of updates of the view object and a corresponding plurality of time stamps associated with times the plurality of updates are obtained.

15. The method of claim 14, further comprising:
initiating the identity resolution process using a scheduled task at the account of the data provider, the initiating based on the stream object detecting an update of the plurality of updates to the view object.

16. The method of claim 11, further comprising:
performing a data enrichment process to obtain enrichment data associated with the user, the enrichment data comprising additional PII that is supplemental to the PII stored in the source table.

17. The method of claim 16, wherein performing the data enrichment process further comprises:
retrieving the enrichment data from an enrichment database of the data provider based on the secure identifier of the user.

18. The method of claim 16, further comprising:
updating the result table with the enrichment data associated with the user.

19. The method of claim 11, further comprising:
detecting a request for additional PII of the user, the request communicated by the account of the data consumer to an account of a second data consumer, and the request including the secure identifier of the user.

20. The method of claim 19, further comprising:
retrieving a second secure identifier of the user, the second secure identifier generated based on a second identity resolution process, and the second identity resolution process performed at the account of the data provider based on an update of PII of the user at the account of the second data consumer;
replacing the secure identifier in the request with the second secure identifier to generate a revised request; and
forwarding the revised request to the account of the second data consumer.

21. A computer-storage medium comprising instructions that, when executed by one or more processors of a machine, configure the machine to perform operations comprising:
generating, at an account of a data provider, a view object of personally identifiable information (PII), the PII stored in a source table managed by an account of a data consumer and shared with the account of the data provider via a share object and a second view object at the account of the data consumer;
detecting using a stream object at the account of the data provider, an update to the PII stored in the view object;
performing an identity resolution process based on detecting the update to the PII stored in the view object, the identity resolution process comprising generating a secure identifier of a user associated with the PII, and the identity resolution process initiated by a stored procedure at the account of the data provider based on the detecting;
generating at the account of the data provider, a result table including the secure identifier; and
sharing the result table with the account of the data consumer.

22. The computer-storage medium of claim 21, the operations further comprising:
encrypting the secure identifier with an encryption key associated with the user.

23. The computer-storage medium of claim 21, the operations further comprising:
causing at the account of the data consumer, a merge of the result table with the source table.

24. The computer-storage medium of claim 21, the operations further comprising:
configuring at the account of the data provider, the stream object to include a plurality of updates of the view object and a corresponding plurality of time stamps associated with times the plurality of updates are obtained.

25. The computer-storage medium of claim 24, the operations further comprising:
initiating the identity resolution process using a scheduled task at the account of the data provider, the initiating based on the stream object detecting an update of the plurality of updates to the view object.

26. The computer-storage medium of claim 21, the operations further comprising:
performing a data enrichment process to obtain enrichment data associated with the user, the enrichment data comprising additional PII that is supplemental to the PII stored in the source table.

27. The computer-storage medium of claim 26, wherein the operations for performing the data enrichment process further comprising:
retrieving the enrichment data from an enrichment database of the data provider based on the secure identifier of the user.

28. The computer-storage medium of claim 26, the operations further comprising:
updating the result table with the enrichment data associated with the user.

29. The computer-storage medium of claim 21, the operations further comprising:
detecting a request for additional PII of the user, the request communicated by the account of the data consumer to an account of a second data consumer, and the request including the secure identifier of the user.

30. The computer-storage medium of claim 29, the operations further comprising:
retrieving a second secure identifier of the user, the second secure identifier generated based on a second identity resolution process, and the second identity resolution process performed at the account of the data provider based on an update of PII of the user at the account of the second data consumer;
replacing the secure identifier in the request with the second secure identifier to generate a revised request; and
forwarding the revised request to the account of the second data consumer.

* * * * *